United States Patent
Anulf et al.

(10) Patent No.: US 12,470,609 B2
(45) Date of Patent: Nov. 11, 2025

(54) TELEPHONY APPLICATION SERVER NODE, SERVER NODE, AND METHODS THEREIN, IN A COMMUNICATIONS NETWORK

(71) Applicant: Telefonaktiebolaget LM Ericsson (publ), Stockholm (SE)

(72) Inventors: Andreas Anulf, Lidingo (SE); Charles Hegarty, Stockholm (SE); Bhavik Arvindbhai Chauhan, Stockhom (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1 day.

(21) Appl. No.: 18/710,333

(22) PCT Filed: Nov. 15, 2021

(86) PCT No.: PCT/SE2021/051140
§ 371 (c)(1),
(2) Date: May 15, 2024

(87) PCT Pub. No.: WO2023/085989
PCT Pub. Date: May 19, 2023

(65) Prior Publication Data
US 2025/0016210 A1   Jan. 9, 2025

(51) Int. Cl.
*H04L 65/1076* (2022.01)
*H04L 65/1016* (2022.01)

(52) U.S. Cl.
CPC ...... *H04L 65/1076* (2013.01); *H04L 65/1016* (2013.01)

(58) Field of Classification Search
CPC ............... H04W 76/10; H04L 65/1063; H04L 65/1045; H04L 65/1076; H04L 65/1095;
(Continued)

(56) References Cited

U.S. PATENT DOCUMENTS

| | | | |
|---|---|---|---|
| 6,396,837 B1 * | 5/2002 | Wang | H04L 12/5601 370/395.6 |
| 6,775,268 B1 * | 8/2004 | Wang | H04L 47/43 370/352 |

(Continued)

FOREIGN PATENT DOCUMENTS

WO    2021162593 A1    8/2021

OTHER PUBLICATIONS

GSM Association, "Unwanted Robocalls Challenges and Solutions," GSM Association, GSMA Floor2 The Walbrook Building 25 Wallbrook London, UK, Feb. 6, 2020.

*Primary Examiner* — Ninos Donabed
(74) *Attorney, Agent, or Firm* — Frost Brown Todd LLP

(57) ABSTRACT

A method performed by an Internet protocol Multimedia System, IMS, node for handling categorization data associated to a first device in an incoming call invitation from the first device to a second device in a communications network is provided.
The IMS node obtains (303) from the server node, a number of respective data delta. Each data delta is related to a respective device out of a number of devices at a respective subsequent point in time. The respective data delta comprises only categorization data that is updated compared to categorization data relating to a point in time that is earlier than the subsequent point in time.
Upon receiving (304) from the first device, a call invitation to the second device, the IMS node enforces (306) a policy relating to categorizing the type of communication of the call, to establish a trust level associated with the first device. The enforcing is based on whether a data delta relating to the first device is obtained among the number of obtained data delta relating to the number of devices.

15 Claims, 11 Drawing Sheets

(58) Field of Classification Search
CPC . H04L 65/80; H04L 65/1073; H04L 65/1069;
H04L 65/1104
See application file for complete search history.

(56) References Cited

U.S. PATENT DOCUMENTS

| | | | | |
|---|---|---|---|---|
| 7,502,831 | B1* | 3/2009 | Macias | H04L 51/04 |
| | | | | 715/752 |
| 7,801,894 | B1* | 9/2010 | Bone | G06F 16/13 |
| | | | | 707/754 |
| 8,788,320 | B1* | 7/2014 | Snyder | G06Q 30/0241 |
| | | | | 705/14.54 |
| 9,280,529 | B2* | 3/2016 | Lemonik | G06F 40/166 |
| 9,811,847 | B2* | 11/2017 | Berger | G06Q 30/0214 |
| 10,324,905 | B1* | 6/2019 | Ross | G06F 16/23 |
| 10,645,545 | B1* | 5/2020 | Rahman | H04W 4/24 |
| 11,659,444 | B1* | 5/2023 | Xing | H04W 24/02 |
| | | | | 370/235 |
| 11,876,928 | B2* | 1/2024 | Anand | H04M 3/42059 |
| 2002/0193143 | A1* | 12/2002 | Miyashita | H04M 1/72403 |
| | | | | 455/556.1 |
| 2005/0007954 | A1* | 1/2005 | Sreemanthula | H04L 47/2441 |
| | | | | 370/229 |
| 2005/0086211 | A1* | 4/2005 | Mayer | G06F 16/951 |
| 2010/0088317 | A1* | 4/2010 | Bone | G06F 16/134 |
| | | | | 709/219 |
| 2010/0241483 | A1* | 9/2010 | Haynes | G06Q 10/1093 |
| | | | | 715/764 |
| 2010/0287146 | A1* | 11/2010 | Skelton | G06Q 10/06 |
| | | | | 707/705 |
| 2011/0208822 | A1* | 8/2011 | Rathod | G06Q 30/02 |
| | | | | 709/206 |
| 2011/0289574 | A1* | 11/2011 | Hull | G06Q 30/0601 |
| | | | | 726/7 |
| 2014/0074629 | A1* | 3/2014 | Rathod | G06Q 10/10 |
| | | | | 705/14.73 |
| 2015/0033180 | A1* | 1/2015 | Nakagawa | G06F 3/0485 |
| | | | | 715/784 |
| 2015/0062012 | A1* | 3/2015 | Yamano | G06F 3/04845 |
| | | | | 345/158 |
| 2015/0074189 | A1* | 3/2015 | Cox | H04L 12/1822 |
| | | | | 709/204 |
| 2015/0199111 | A1* | 7/2015 | Okada | G06F 3/04817 |
| | | | | 345/173 |
| 2015/0213124 | A1* | 7/2015 | Dong | G06F 16/27 |
| | | | | 707/722 |
| 2018/0324297 | A1* | 11/2018 | Kent | H04Q 3/0083 |
| 2021/0168415 | A1* | 6/2021 | Zhu | H04L 65/612 |
| 2021/0224402 | A1* | 7/2021 | Sher-Jan | G06F 21/577 |

* cited by examiner

TELEPHONY APPLICATION SERVER NODE, SERVER NODE, AND METHODS THEREIN, IN A COMMUNICATIONS NETWORK

This application is a national-phase entry under 35 USC § 371 of International Application No. PCT/SE2021/051140, filed Nov. 15, 2021, titled "Telephony Application Server Node, Server Node, and Methods Therein, in a Communications Network," the contents of which are hereby incorporated herein in its entirety.

TECHNICAL FIELD

Embodiments herein relate to a Telephony Application Server (TAS) node, a first server node, and methods therein. In some aspect they relate to handling categorization data associated to a first device in an incoming call invitation from the first device to a second device in a communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, the 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of Machine to Machine (M2M) communication, also known as the Internet of things, aiming at lower cost, lower battery consumption and lower latency than 4G equipment.

The Internet Protocol (IP) Multimedia Subsystem (IMS) is a well-known 3GPP standard allowing sessions to be setup between two or more parties for a broad variety of services such as voice or video call, interactive messaging sessions or third-party specific applications. A protocol chosen by 3GPP is the Session Initiation Protocol (SIP). The SIP provides a mechanism for registration of UEs and for setting up multimedia sessions. The SIP REGISTER method enables the registration of user agent's current location and the SIP INVITE method enables the setting up of a session. IMS is implemented by Public Land Mobile Network (PLMN) operators as an architectural framework for delivering IP multimedia services to their subscribers.

With the increase of fraudulent and SPAM calls from calling devices to called devices in the communications network, operators are requesting functionality and solutions that mitigate this trend, to protect the called devices. Alliance for Telecommunications Industry Solutions (ATIS) has defined a framework and a mechanism, e.g., ATIS-0300116 and ATIS-1000074, to minimize illegal robocalls, scams, and Caller ID spoofing. Some of these mechanisms, e.g. STIR/SHAKEN, have been introduced into 3GPP, e.g. TS 24.229.

STIR/SHAKEN, also referred to as SHAKEN/STIR, is a suite of protocols and procedures intended to combat caller ID spoofing on public telephone networks. Caller ID spoofing is used by robocallers to mask their identity or to make it appear the call is from a legitimate source, often a nearby phone number with the same area code and exchange, or from well-known agencies like the Internal Revenue Service or Ontario Provincial Police. This sort of spoofing is common for calls originating from voice-over-IP (VoIP) systems.

One of the logical functions in the ATIS framework and/or architecture is a Call Validation Treatment (CVT) which may be an application server function or a third-party application for applying anti-spoofing mitigation techniques based on analytics service using reputation data sources. The CVT may also provide information in its response that indicates how the results of the verification related to a calling user A should be displayed in a device of a called user B.

The Multimedia Telephony Application Server (MMTel AS), and the virtual Multimedia Telephony Application Server (vMTAS), are examples of AS based functions that utilize the CVT, or partly provide this validation functionality itself, in order to determine or qualify the nature and purpose of calls, hereafter referred to as "call qualification functionality", associated to an IMS network according to prior art. They provide mechanisms for an operator to protect subscribers such as a called user B from receiving incoming fraud & nuisance, e.g. Robo/Spoof, calls from a calling user A. The functionality is based on caller categorization information, i.e. classification of a specific phone number relating to the calling user A, received from a third-party analytic function, such as the i.e. CVT, over a Representational State Transfer (REST) based interface. Caller categorization information is referred to as "reputation" information in ATIS.

Vendors of SPAM or fraud protections mechanism are primarily providing anti-robocalling and/or anti-Spoofing, such as e.g. Call Qualification, functionality on the terminating side, i.e. at the called device B based on external analytic functions, such as e.g. external to the verification and/or call protection functionality.

The CVT and/or a third-party analytic function is invoked, via a REST based interface, during call set-up to obtain categorization and/or reputation information pertaining to the calling device A, such as e.g. an A-number. Other information is also required to enable the CVT and/or a third-party analytic function to learn and analyze, e.g. the called device B. This is leading to latency problems during the call set-up. The problem becomes more serious the more data that is required for analytics.

Operators have strict requirements on call-set up times. From an end to end (e2e) call set-up perspective, the approximate budget a terminating telephony application server is assigned 80 ms from initial Filter Criteria (iFC) invocation. This budget is not met when also invoking a CVT function.

SUMMARY

An object of embodiments herein is to improve the performance of a communications network using categorization data associated to a calling device for call set-up.

According to an aspect of embodiments herein, the object is achieved by a method performed by an IMS node for handling categorization data associated to a first device in an incoming call invitation from the first device to a second device in a communications network.

The IMS node obtains a number of respective data delta from the server node. Each data delta is related to a respective device out of a number of devices at a respective subsequent point in time. The respective data delta comprises only categorization data that is updated compared to categorization data related to a point in time that is earlier than the subsequent point in time.

Upon receiving from the first device, a call invitation to the second device, the IMS node enforces a policy related to categorizing the type of communication of the call, to establish a trust level associated with the first device. The enforcing is based on whether a data delta relating to the first device is obtained among the number of obtained data delta related to the number of devices.

According to another aspect of embodiments herein, the object is achieved by a method performed by a server node for handling categorization data associated to a first device in an incoming call invitation from the first device to a second device in a communications network.

The server node creates a number of respective data delta. Each data delta is related to a respective device out of a number of devices at a respective subsequent point in time. The respective data delta comprises only categorization data that is updated compared to categorization data relating to a point in time that is earlier than the subsequent point in time.

The server node sends each of the respective created data delta out of the number of respective data delta, to an IMS node. This enables the IMS node to, upon receiving from the first device, a call invitation to the second device, enforce a policy related to categorizing a type of communication of the call to establish a trust level associated with the first device. The enforcing is to be based on whether a data delta relating to the first device is obtained among the number of obtained data delta relating to the number of devices.

According to another aspect of embodiments herein, the object is achieved by an IMS node configured to handle categorization data associated to a first device in an incoming call invitation from the first device to a second device in a communications network. The IMS node is further configured to:

Obtain from the server node, a number of respective data delta, each data delta is adapted to be related to a respective device out of a number of devices at a respective subsequent point in time, which respective data delta is adapted to comprise only categorization data that is updated compared to categorization data related to a point in time that is earlier than the subsequent point in time, upon receiving from the first device, a call invitation to the second device, enforce a policy related to categorizing the type of communication of the call, to establish a trust level adapted to be associated with the first device, which enforcing is adapted to be based on whether a data delta relating to the first device is obtained among the number of obtained data delta adapted to be related to the number of devices.

According to another aspect of embodiments herein, the object is achieved by a server node configured to handle categorization data associated to a first device in an incoming call invitation from the first device to a second device in a communications network. The server node is further configured to:

Create a number of respective data delta, each data delta being adapted to be related to a respective device out of a number of devices at a respective subsequent point in time, which respective data delta is adapted to comprise only categorization data that is updated compared to categorization data related to a point in time that is earlier than the subsequent point in time, send each of the respective created data delta out of the number of respective data delta, to an IMS node. This enables the IMS node to, upon receiving from the first device, a call invitation to the second device, enforce a policy adapted to be related to categorizing a type of communication of the call to establish a trust level associated with the first device, which enforcing is adapted to be based on whether a data delta relating to the first device is obtained among the number of obtained data delta adapted to be related to the number of devices.

Thanks to the data delta, the IMS node can enforce a policy related to categorizing the type of communication of the call, to establish a trust level associated with the first device without requiring an external request for a full dataset during a call set-up towards server node. This results in an improved performance of a communications network using categorization data associated to a calling device for call set-up Embodiments herein e.g. brings the following advantages of achieving:

Enhanced capabilities offered to call qualification and/or anti-robocalling applications to meet end-to-end call set-up latency times.

Enhanced capabilities offered to CVT providers to meet end-to-end latency challenges.

Configurable and future proof, and other use cases based on agreed metadata may be implemented.

Category data delta such as a data delta provided via Application Programming Interface (API), that is future proof and may be adapted for other services. It is optimized from the perspective of downloaded (delta) data based on cursor.

An end-user and/or a subscriber that is shielded from processing impacts that may occur due to call qualification.

BRIEF DESCRIPTION OF THE DRAWINGS

Examples of embodiments herein are described in more detail with reference to attached drawings in which.

DETAILED DESCRIPTION

Embodiments herein relate to a communications network and the handling of a categorization data associated to a calling first device of an incoming call to be set-up to a second device.

Examples of embodiments herein provide a call qualification latency reduction framework. The latency reduction framework may be comprised in an IMS node such as an application server. They reduce the number of invocations to a server node such as a CVT analytic function during call set-up towards the called, second device, i.e. the terminating user. According to embodiments herein, call setup processing towards the second device is enhanced ensuring that strict call setup requirements are met.

Figure 1:
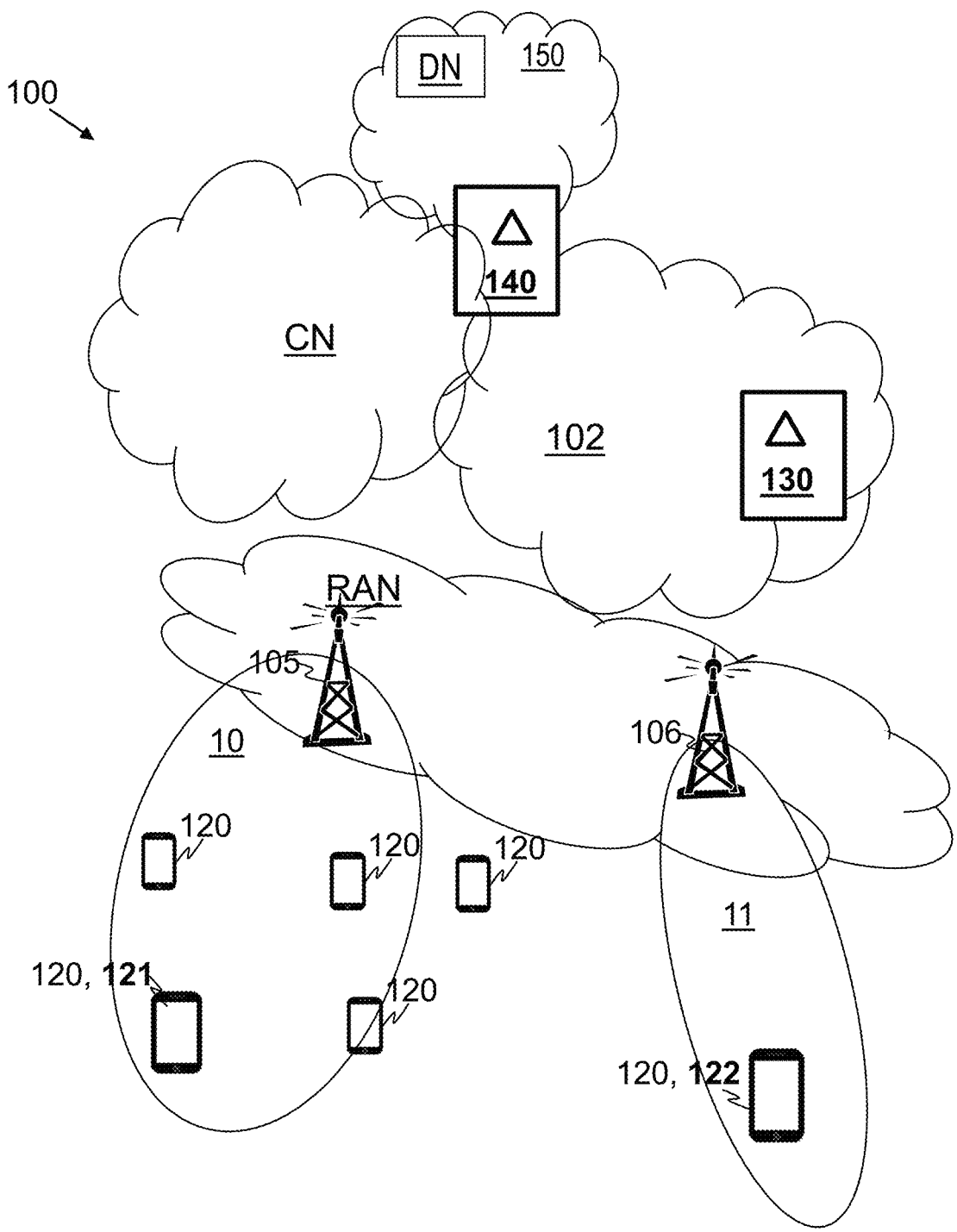
FIG. 1 is a schematic block diagram illustrating embodiments of a communications network.
Figure 2:
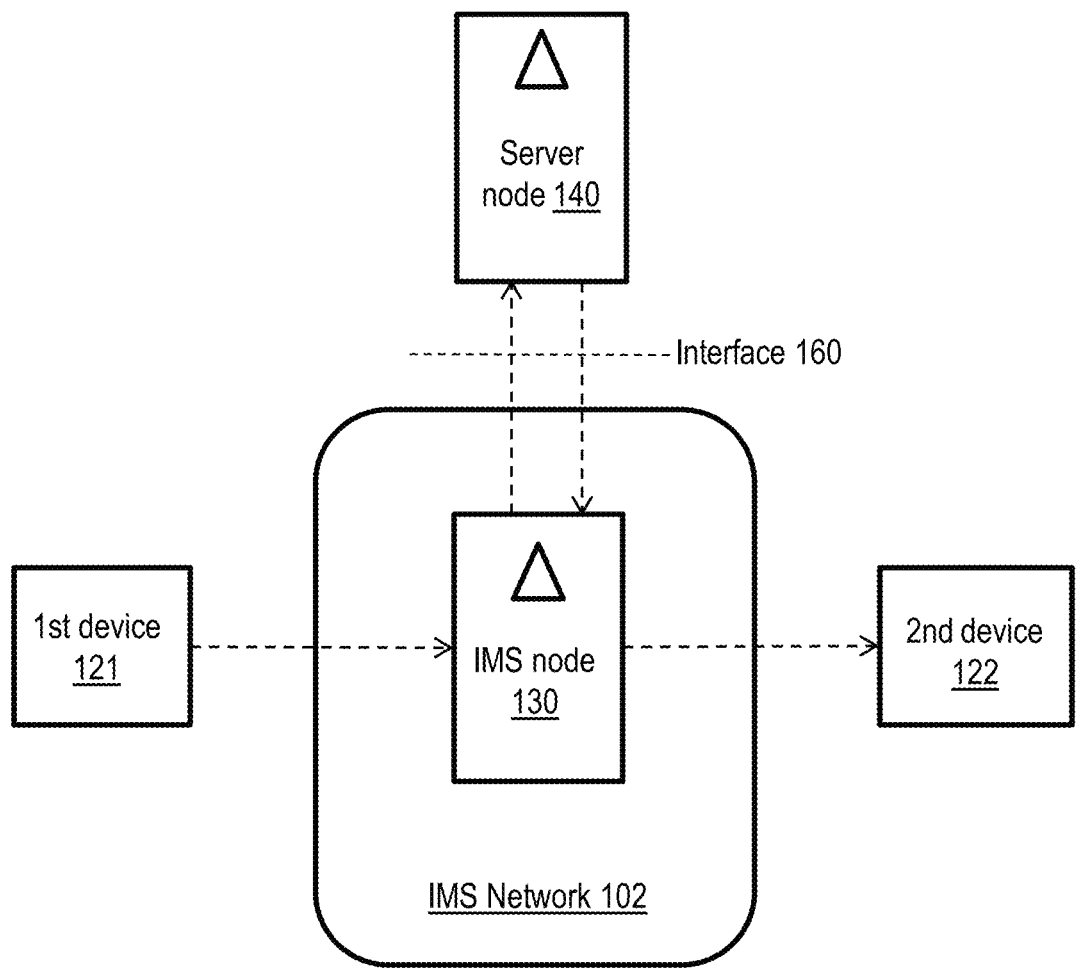
FIG. 2 is a schematic block diagram illustrating embodiments of an IMS network.

FIG. 1a is a schematic overview depicting a communications network 100 wherein embodiments herein may be implemented. The communications network 100 comprises one or more RANs and one or more CNs. The communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

The communications network 100 further comprises an Internet Protocol (IP) Multimedia Subsystem (IMS) network 102, in which IMS network 102, a first IMS node 110, a first server 131, a second server and a subscriber server 140 operates. The IMS network 102 is an architecture for delivering media content over an IP packet switched transport.

A number of network nodes operate in the communications network 100 such as e.g. a network node 105 and a network node 106. Each of the network node 105 and network node 106 provides radio coverage in a number of cells which may also be referred to as a beam or a beam group of beams, such as the network node 105 a cell 10 provided by the network node 105, and a cell 11 provided by the network node 106.

Each of the network node 105 and network node 106 may be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 105 depending e.g. on the first radio access technology and terminology used. The network nodes 105 and 106 may be referred to as a serving network nodes and communicates with UEs such as a first device 121 and a second device 122, with Downlink (DL) transmissions to the devices 121, 122, and in Uplink (UL) transmissions from the devices 121, 122.

A number of devices 120 operate in the communication network 100, such as e.g. the first device 121 and the second device 122. According to example scenarios herein, the first device 121 may be referred to as the calling device 121, and the second device 122 may be referred to as the called device 122. The first device 121 and the second device 122 may also be referred to as UEs, IoT devices, mobile stations, non-access points (non-AP) STAs, STAs, user equipments and/or a wireless terminals, Application Servers (AS), services, public numbers, communicating via one or more Access Networks (AN), e.g. the RAN, to one or more CNs. It should be understood by the skilled in the art that "wireless device" is a non-limiting term which means any terminal, wireless communication terminal, user equipment, Machine Type Communication (MTC) device, Device to Device (D2D) terminal, a radio device in a vehicle, or node e.g. smart phone, laptop, mobile phone, sensor, relay, mobile tablets or even a small base station communicating within a cell.

An IMS node 130 operates in the IMS network 102. The IMS node 130 may e.g. be an application server such as an MMTel AS.

A server node 140 serves the IMS node 130. The Server node 140 is outside the IMS network 102 and may be referred to as an external server. The Server node 140 may e.g. be a CVT server.

Methods herein may be performed by the IMS node 130 and the server node 140. As an alternative, a Distributed Node (DN) and functionality, e.g. comprised in a cloud 150 as shown in FIG. 1a, may be used for performing or partly performing the methods herein.

FIG. 1b shows a schematic overview of the IMS network 102 according to an example scenario wherein embodiments herein may be applied. The IMS network 102 comprises one or more IMS nodes, such the IMS node 130. The IMS node 130 may e.g. be an application node such as an MMTel AS. The server node 140 is accessible by the IMS node 130. The IMS network 102 may e.g. be a Communication Service Provider (CSP).

According to embodiments herein, the IMS node 130 may communicate with the first device 121, the second device 122 and the server node 140.

The IMS node 130 implementing embodiments herein e.g. avails of a latency-reducing interface 160 to obtain data delta with categorization data of the calling first device. Embodiments herein may e.g. relate to a call qualification service, also referred to as anti-robocalling service. The latency-reducing interface 160 may e.g. be a Hypertext Transfer Protocol (HTTP) based interface. To obtain data delta according to embodiments herein, may e.g. be referred to as fetching files or fetching data delta. The format of the files may be configurable to suit the needs of the application server and a CVT. The categorization data of the calling first device may e.g. be referred to as reputation data of the calling first device.

The server node 140 such as the CVT comprises a full dataset data pertaining to the categorization data of the devices 120, 121 including the first device 121 as being the calling user, stored in data base such as a data serve).

A number of embodiments will now be described, some of which may be seen as alternatives, while some may be used in combination.

Embodiments herein relate to a full dataset, also referred to as a full set of data, and data delta.

Full Dataset

The server node 140 may comprise or be accessible to a server such as a database. The database is adapted to comprise a respective full data set to a number of devices 120 in the communications network 100. Thus the server node 140 has stored full data sets associated to a number of different devices. The respective full dataset comprises data pertaining to categorization of the devices. This is used for checking at an incoming call invitation, the categorization of a calling device stored in a data base.

According to some embodiments herein, the full data sets are made available to download to the IMS node 130. A full data set may comprise file types such as metadata file and data file. A metadata file is an index file that may be present in each directory level of a full dataset. It may be used to list e.g. contents of a current directory file and their md5sum values that may be validated after downloading. It may also comprise the version, the format of the included files, e.g. csv, tar, tar.gz, created time etc. A full dataset may comprise actual data that is used for processing by the requesting application, such as the IMS node 130.

Data Delta

As opposed to requesting and receiving a download of a full data set comprising the categorization data of a calling device from a server node, embodiments herein relate to and provide obtaining of a data delta. The data delta only comprises the latest updates of the full data set. The data delta is the full data at a subsequent point in time minus the full data at a time that is earlier than the subsequent point in time.

Figure 3:
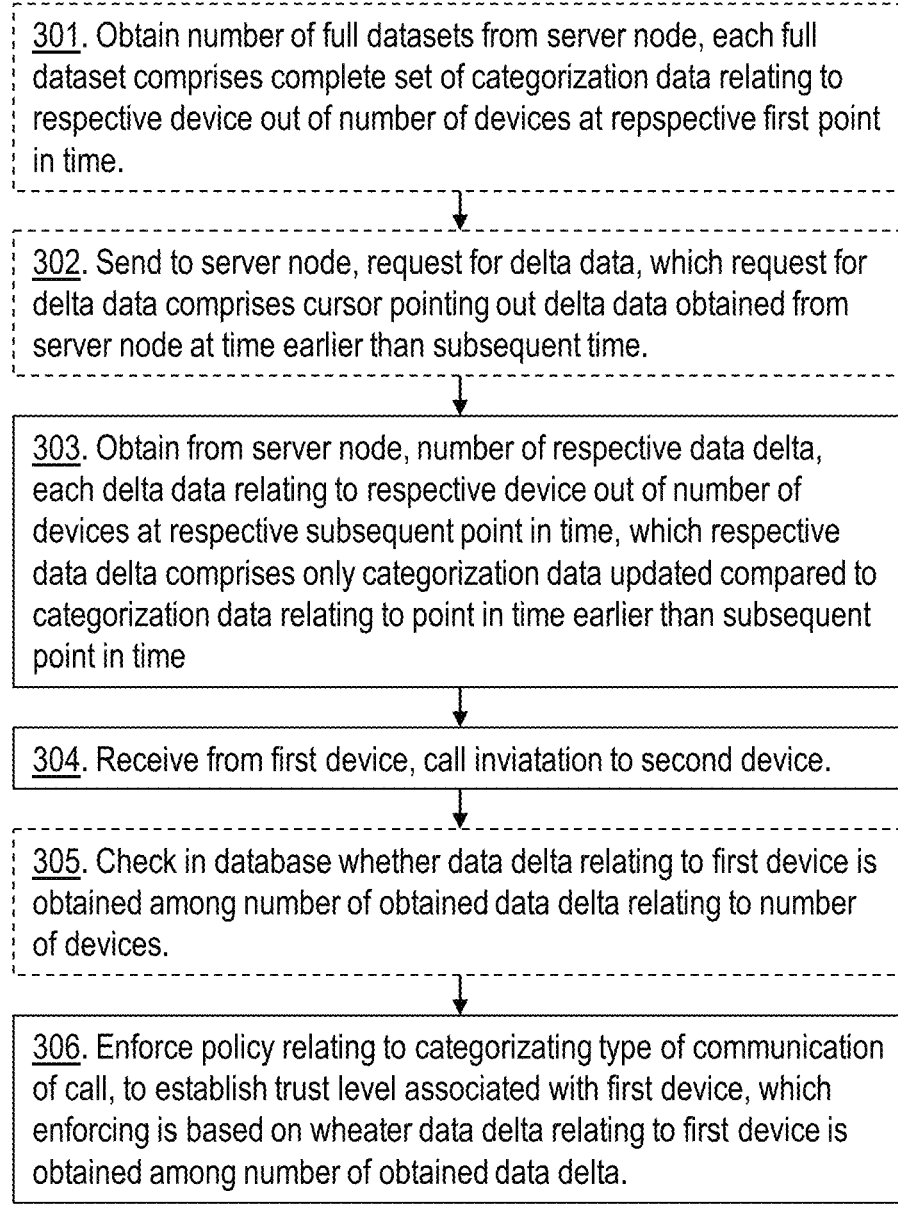
FIG. 3 is a flowchart depicting embodiments of a method in an IMS node.

FIG. 3 shows example embodiments of a method performed by the IMS node 130, e.g. by means of a Latency Reduction Function (LRF). The method is for handling categorization data associated to the first device 121 in an incoming call invitation from the first device 121 to the second device 122 in the communications network 100.

Embodiments herein are applicable to applications such as e.g. call qualification and/or anti-robocalling applications, running in the IMS node 130. Categorization data of the first device 121 may e.g. comprise calling party, i.e. first device 121 identification, category and/or classification information of the first device 121 such as e.g. Fraud, Nuisance etc., sub-category and/or classification information of the first device 121 such as e.g. Nuisance or tele-sales, display string related to the first device 121 such as e.g. information that may be displayed to the served user etc.

On reception of a call invitation from the first device 121 towards the second device 122 the latency reduction function checks for categorization data related to device 121 in a local database.

The method comprises any one or more of the following actions, which actions may be taken in any suitable order. Actions that are optional are presented in dashed boxes in FIG. 3.

Action 301

In some optional embodiments, the IMS node 130 obtains a number of full datasets from the server node 140. Each full dataset comprises a complete set of the categorization data relating to a respective device out of a number of devices 120 at a respective first point in time.

The obtaining of the number of full datasets from the server node 140, may be performed by downloading the number of full datasets from the server node 140 at the first point in time, and storing each full data related to the respective device out of the number of devices 120 in a database.

Action 302

This is an optional action. For each respective device out of the number of devices 120, the IMS node 130 may send a request for data delta to the server node 140. The request for data delta may comprise a cursor pointing out a data delta that was obtained from the server node 140, at said time that is earlier than the subsequent point in time. This is to inform the server node 140 abut the latest data delta that the IMS node 130 knows such that the server node can send a current data delta compared to the earlier time.

Action 303

The IMS node 130 obtains a number of respective data delta from the server node 140. Each data delta relates to a respective device out of the number of devices 120, at a respective subsequent point in time. The respective data delta comprises only categorization data that is updated compared to categorization data relating to a point in time that is earlier than the subsequent point in time. The number of respective data delta from the server node 140 may be obtained at subsequent time intervals.

This means that the IMS node 130 obtains data delta from one or multiple devices 120. Further, for each specific device out of the number of devices 120, a number, i.e. the IMS node obtains one data delta at one subsequent point in time that is earlier than the subsequent point in time, or several data delta at respective several subsequent points in time.

The obtaining of the number of respective data delta relating to the respective device out of the number of devices 120, may be performed by downloading the respective data delta from the server node 140 at configured time intervals, and storing the respective data delta related to respective device out of the number of devices 120 in a database.

In some embodiments as mentioned above in Action 302, a request for data delta sent to the server device 140 comprises a cursor pointing out a data delta that was obtained from the server node 140, a time that is earlier than the subsequent point in time. In these embodiments, each of the obtained data delta out of the number of data delta relating to the subsequent point in time, is created based on the respective cursor.

A cursor when used herein means a representation of a database state information of the server nodes 140 database at which the data delta was taken. Whenever categorization data in the server node 140 database state changes a new cursor value is expected in the successful response to the requesting application—e.g., IMS node 130 sent by the remote data server. The cursor can be a parameter passed back each time the HTTP/HTTPS caller categorization delta API is called. This embodiment enables the IMS node 130 to effectively fetch and request the latest updates while also enabling the server node 140 to implement effective mechanism to return only the latest updates.

Action 304

The IMS node 130 receives a call invitation from the first device 121. The call invitation is an invitation to the second device 122.

Action 305

Upon receiving the call invitation to the called device 122, the IMS node 130 may check in the database whether a data delta relating to the first device 121 is obtained among the number of obtained data delta relating to the number of devices 120.

Action 306

Upon receiving from the first device 121, the call invitation to the second device 122, the IMS node 130 enforces a policy relating to categorizing the type of communication of the call, to establish a trust level associated with the first device 121.

A policy relating to categorizing the type of communication of the call may e.g. be invoked. The policy may be implemented on individual subscriber level, e.g., for the device 121, invoking the latency reduction functionality and resulting checks, or global level, e.g, for all call invitations regardless of devices invoke the latency reduction functionality and resulting checks. A further policy based on the firing of the aforementioned policy, e.g., policy indicated that LRF shall be invoked, may be implemented, this is related to the treatment of the received call invitation from device 121 e.g., if categorization data in the local database indicated "fraud" decide on how the received call shall be treated e.g. reject call back to device 121 or reject call back to device 121 and forward a message to device 122 indicating rejection of call.

To enforce a policy may mean to check a parameter that may be configured in association with subscriber or node level.

The establishing of a trust level associated with the first device 121 may e.g. relate to prevent fraud by the first device 121, but there are also other use cases that need be comprising some Robocalls that are classified as "bad" but also Robocalls that are actually emergency warnings like "Please leave the area as hurricane is approaching".

The levels used to establish the trust level when used herein may e.g. be "fraud", "nuisance" or "wanted and/or urgent".

The enforcing is based on whether a data delta relating to the first device 121 is obtained among the number of obtained data delta relating to the number of devices 120.

In some embodiments, the IMS node 130 may specifically have checked in the database whether a data delta relating to the first device 121 is obtained among the number of obtained data delta relating to the number of devices 120. In these embodiments, the enforcing of the policy is based on said checking of the database.

For example, the IMS node 130 checks among its obtained data delta for any data related to the first device 121, i.e. the calling device, e.g. for a received A-number of the first device 121.

If the IMS node 130 gets a hit, i.e. finds a data delta related to the first device 121 among the data delta related to the number of devices 120, it uses the stored data delta to enforce the policy or e.g. compares the stored data delta with the corresponding full dataset obtained in some embodiments to enforce the policy. The categorization data comprised in delta data may determine which policy to enforce. The policy that shall be enforced depend on whether the data delta e.g. comprises a categorization that indicates fraud and thus the call shall be rejected or a categorization that actually is an emergency warning and thus the call shall be approved. The data delta may be passed to an application, such as an MMTel AS in the IMS node 130. No real time invocation of the remote server node 140 (CVT) is needed in this instance, just a local database lookup in the IMS-node 130.

Figure 4:
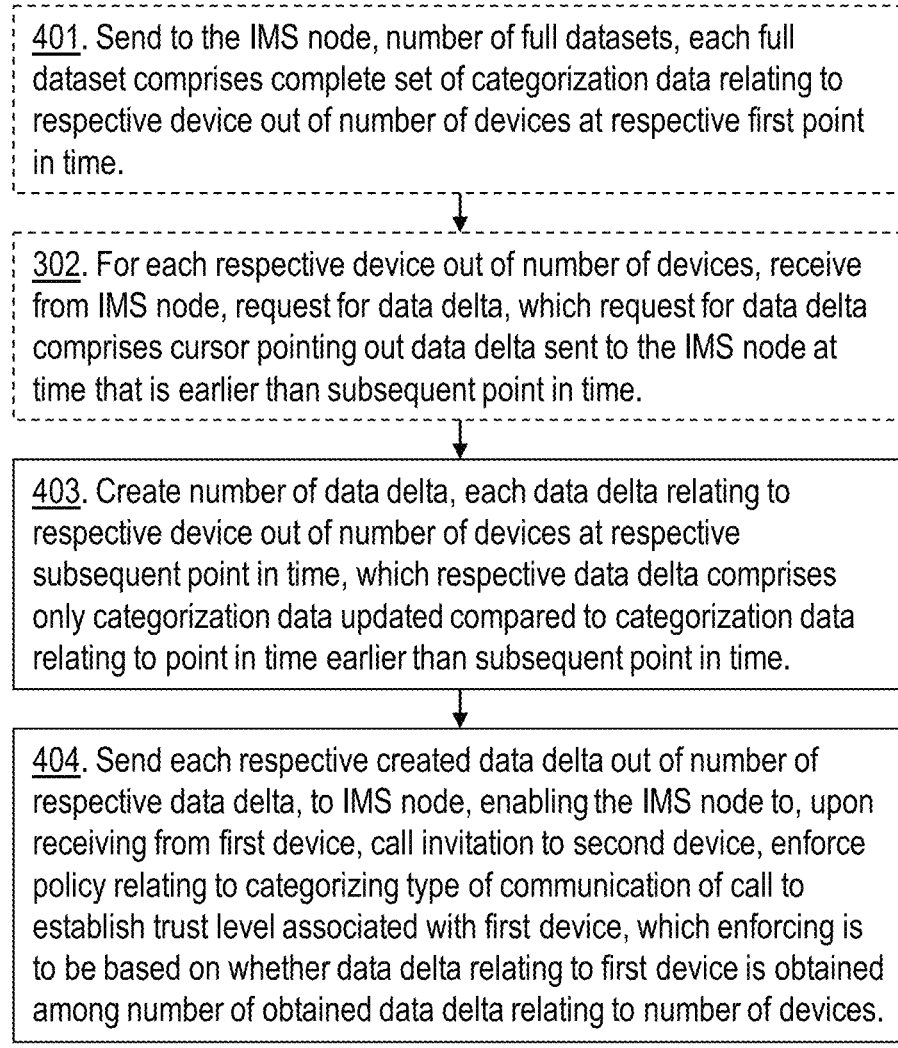
FIG. 4 is a flowchart depicting embodiments of a method in a server node.

FIG. 4 shows example embodiments of method performed by the server node 140. The method is for handling categorization data associated to a first device 121 in an incoming call invitation from the first device 121 to a second device 122 in a communications network 100.

The method comprises any one or more of the following actions, which actions may be taken in any suitable order. Actions that are optional are presented in dashed boxes in FIG. 4.

Action 401

In some optional embodiments, the server node 140 sends a number of full datasets to the IMS node 130. Each full dataset comprises a complete set of the categorization data relating to a respective device out of a number of devices 120 at a respective first point in time.

Action 402

In some embodiments, for each respective device out of the number of devices 120, the server node 140 receives a request for said data delta from the IMS node 130. The request for data delta may comprise a cursor. The cursor points out a data delta that was sent to the IMS node 130 at said time that is earlier than the subsequent point in time. and Action 403

The server node 140 creates a number of respective data delta. Each data delta relates to a respective device out of the number of devices 120 at a respective subsequent point in time. The respective data delta comprises only categorization data that is updated compared to categorization data relating to a point in time that is earlier than the subsequent point in time.

The respective creating of the data delta, may further comprise that the server node 140 updates each respective full dataset relating to the device, with the associated created data delta.

In some embodiments, a received request for data delta comprises a cursor pointing out a data delta that was sent to the IMS node 130 at said time that is earlier than the subsequent point in time. In these embodiments, each created data delta out of the number of created data delta relating to the subsequent point in time, is created based on the respective cursor.

Action 404

The server node 140 sends each of the respective created data delta out of the number of respective data delta, to the IMS node 130. This enables the IMS node 130 to, upon receiving from the first device 121, a call invitation to the second device 122, enforce a policy. The policy relates to categorizing a type of communication of the call to establish a trust level associated with the first device 121. The enforcing is to be based on whether a data delta relating to the first device 121 is obtained among the number of obtained data delta relating to the number of devices 120.

The number of respective created data delta may be sent to the IMS node 130 at subsequent time intervals.

Embodiments herein such as mentioned above will now be further described and exemplified. The text below is applicable to and may be combined with any suitable embodiment described above.

The example latency-reducing interface 160 provided in some embodiments herein, may be a pull interface from the IMS node 130 such as an application server or TAS to a CVT).

The latency reduction framework according to embodiments herein e.g. comprising obtaining by the IMS node 130, data delta from the server node 140, such as a download frequency file mechanism, is configurable e.g. regarding metadata to be obtained but also the frequency of obtaining the data delta.

It may be pre-deployment or dynamically configured, such as e.g. by an interface attribute handshake, during deployment on what data attributes that shall be made available from the IMS network 102 e.g. a CVT and used by the IMS node 130 in its quest to categorize a specific device such as the first device 121 in order to prevent for example fraud and/or SPAM calls. The word "categorize" may also be referred to as "classify". To categorize a specific device may be to categorize the associated phone number of that device.

Embodiments herein may be implemented prior to an invocation of a CVT real-time interface, i.e. the interface made available from CVT functions today. A CVT real-time interface when used herein may mean a REST API.

Embodiments herein may comprise data such as the data delta or the full dataset related to the devices 120, 121, 122, e.g. cashed and/or stored in a database in the IMS node 130. As mentioned above, the data may e.g. be related to, calling party identification, category information and/or classification information such as e.g. Fraud, Nuisance etc., sub-category and/or classification information such as e.g. Nuisance, tele-sales, display string such as e.g. information that may be displayed to the served user etc. This information may be updated and/or pulled based on configured time attributes e.g. via latency-enhanced interface towards the in the server node 140 such as the CVT.

Based on the available data delta, the IMS node 130 implementing the handling of the categorization data associated to a calling device such as the first device 121, the call qualification and/or anti-robocalling service, uses the data delta to enforce such as implement policies based on how the call shall be treated. The information is locally available at the IMS node 130 without requiring an external request during call set-up towards server node 140 such as the CVT.

As opposed to requesting & receiving a full download of the full dataset comprising categorization data on all possible devices, metadata etc., on every request, from the remote server node 140, embodiments herein provide that the concept of delta data whereby only the latest updates to the full data set is returned. The data delta is the full data at a subsequent point in time minus the full data at a time that is earlier than the subsequent point in time full data set In some embodiments, this data delta is implemented by using a "cursor". The "cursor" represents the remote data server database state information to be used for delta download of only a part the of full dataset. Whenever categorization data in the server node 140 database state changes a new data delta and a new cursor value is expected in the successful response (to the requesting application, e.g. LRF) sent by the remote data server. The cursor will be a parameter passed back to the IMS node 130 each time an HTTP/HTTPS caller categorization delta API is called, an new API provided according to embodiments herein. A HTTP/HTTPS caller when used herein means the requesting function, e.g. in the IMS node 130. E.g. the IMS node 130 sends an API request with cursor representing delta x, i.e. the cursor it has received from the server node 140 at its last request, and gets back delta y. The data delta download may be incremental on top last full download in the requesting application.

This enables the IMS node 130 to effectively request data delta based on delta x and obtain delta y, that is the latest updates from delta x until now. This may be performed by the IMS node 130, e.g. by its requesting function passing the cursor in the API for requesting categorization data of the last time delta x, to the receiver of the request, e.g. server node 140. It also enables the server node 140 to implement effective mechanism to return only the latest updates, i.e. the data delta, i.e. from the last update indicated by the received cursor in the API for requesting categorization data from the requesting function, IMS node 130. This enhances load and latency reduction mechanisms on both entities Some embodiments herein further provide the interface 160 to download the data delta from the server node 140. This API is of a fetch and/or pull-receive nature. The IMS node 130 initiates the transaction only. The server node 140 may not push info to the requesting IMS node 130 on for example subscription, security, and load concerns. It may be decided in cooperation with the server node 140 regarding the service in question, the frequency of obtaining the data delt initiated by the requesting IMS node 130 such as its application.

The requesting IMS node 130 such as its application, e.g. LRF, may store the data delta as per the methods mentioned above. E.g. a call qualification application running in the IMS node 130 may invoke the methods according to embodiments herein, e.g. on reception of incoming call invitation from the first device 121 and process the obtained and stored data delta from different devices 120 to categorize the calling party, i.e. the first device 121. If data delta of the first device 121 is found in the stored data delta from different devices 120 then policies implemented in the IMS node 130 such as it's LRF, may be enforced accordingly, e.g. forward a call to voice mail, process call further etc. For requests which result in successful categorization of calling party such as the first device 121, e.g. via the LRF, there is no need to invoke again the server node 140, e.g. to invoke the CVT interface to obtain categorization data in real-time for call invitations from specific devices e.g. the first device 121, i.e. the interface made available from CVT functions today that are usually invoked on every call invitation for ever specific device in the network, it may be millions of devices making millions of call invitations per second. This ensures that latency budgets are met from an end-to-end perspective. The richer the data set/data categorization information downloaded on the categorization data of the devices 120, 121 such as the caller category info API, the more efficient and speedier the handling will be.

Below some examples are shown.
HTTP Request (Example):

```
POST /v1/callercategoryList HTTP/1.1
HOST: server
Content-Type: application/json; charset=utf-8
```

-continued

```
Accept: application/json
{
   "cursor": "MjAyMDA5MTVUMTc6MDU6MDAuMjM"
}
```

| Property | M/O | Type | Comment |
|---|---|---|---|
| cursor | M | String | The cursor received from the last query. If empty, it starts the list from the beginning. |

HTTP Response (Example)

```
HTTP/1.1 200 OK
Content-Type: application/json
{
   "entries": {
      {
         "op": "0",
         "phoneNumber": "+14258303650",
         "category": "3",
         "subcategory": "302",
         "displayInformation": ""
      },
      {
         "op": "0",
         "phoneNumber": "+14158335544",
         "category": "2",
         "subcategory": "213",
         "displayInformation"; "Robocaller"
      },
      {
         "op": "0",
         "phoneNumber": "+12065551234",
         "category": "4",
         "subcategory": "412",
         "displayInformation": "Possible Spam"
      },
      {
         "op": "1",
         "phoneNumber": "+14258303760",
      }
   ],
   "cursor": "dDMwMjAwOTE1VDE3OjE1OjAwLjIz"
}
```

| Property | M/O | Type | Comment |
|---|---|---|---|
| op | M | String | Possible values: 0 "add" 1 "remove". Indicates if the phoneNumber is being added to the list or removed (or updated-value 0). |
| phoneNumber | M | String | E. 164 of the phone number |
| category | M | Integer | The category of call that correlates with specific actions the TAS should take (e.g. FRAUD). Value range: 0-31 |
| subcategory | M | Integer | More granular information about the classification of this call (e.g. Fraud: scam technical help) Value range: 0-999 |
| displayInformation | M | String | The string to be used as caller name (From and PAI Headers). This can be an empty string. Always present if the operation is "add". |
| cursor | M | String | The cursor string to be used in the next request. The cursor guarantees there are no gaps in the data. |

Figure 5:
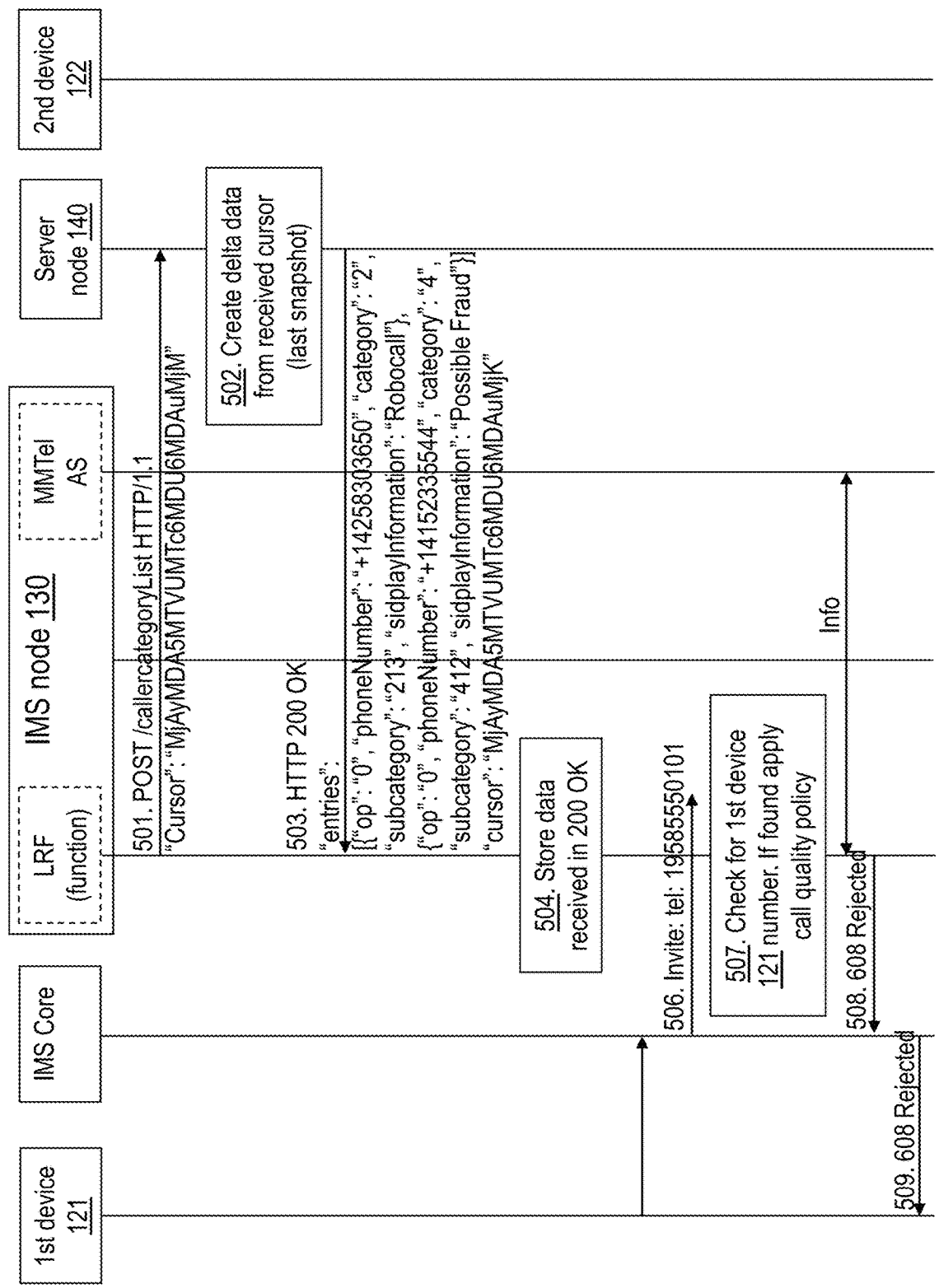
FIG. 5 is a signaling diagram depicting embodiments of a method.

FIG. 5 depicts an example according to embodiments herein.

Steps 501-504: The IMS server downloads data delta e.g. by using a cursor, categorization data from the remote server node 140 at configurable intervals. This data is stored internally in the LRF for later use.

Steps 505-506: Incoming request, the IMS node 130 such as its MMTel AS is invoked, a call qualification function in MMTel AS is invoked. MMTel AS invokes LRF Step 507. the IMS node 130 such as its LRF checks its data delta database with categorization data relating to the number of devices, 120 for the calling first device 121, e.g. the received A-Number of the first device 121. If it gets a hit it uses the stored data delta of the first device 121 to enforce a policy, e.g. depending on the data delta stored, the categorization may e.g. indicate fraud and thus the call shall be rejected. This data delta is passed to the IMS node 130 such as its MMTel AS. No real time invocation of remote server node 140 is needed in this instance, just a local database lookup.

Steps 508-509: The call from the first device 121 is rejected.

Figure 6A:
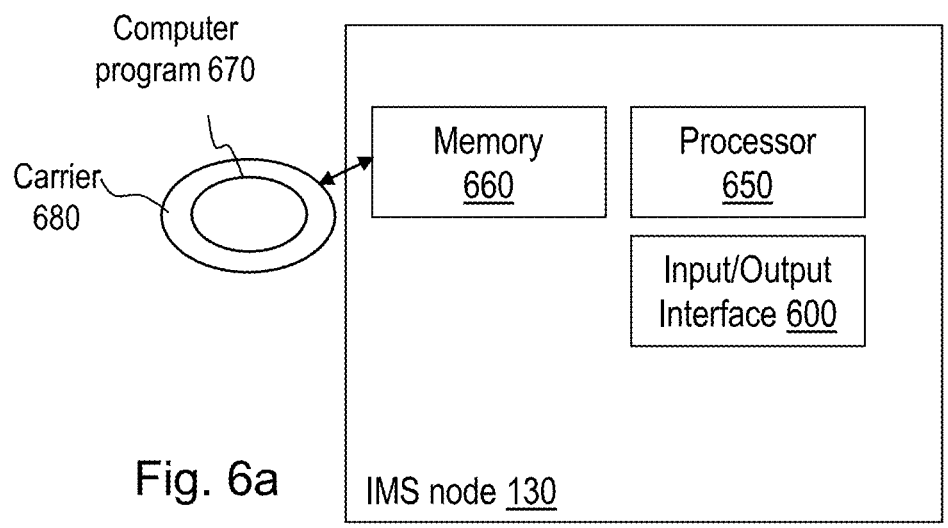
FIG. 6a-b are schematic block diagrams illustrating embodiments of an IMS node.
Figure 6B:
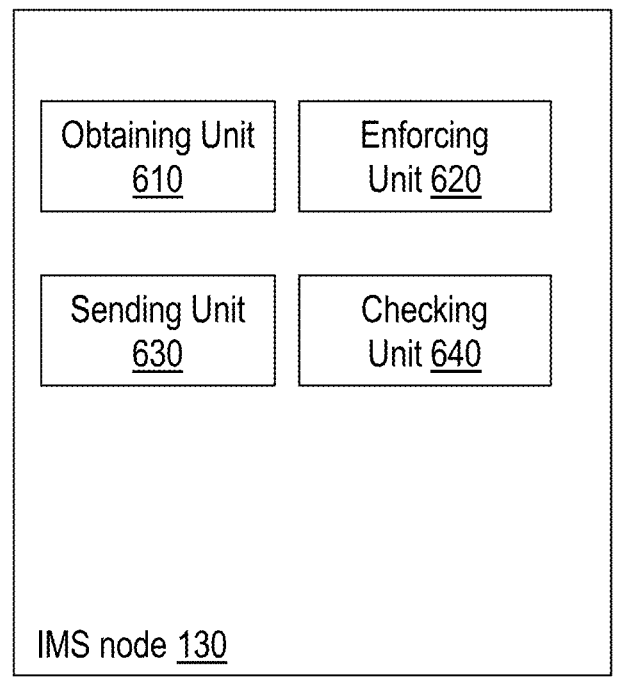

To perform the method actions above, the IMS node 130 may comprise an arrangement depicted in FIGS. 6a and b. The IMS node 130 is configured to handle categorization data associated to the first device 121 in an incoming call invitation from the first device 121 to the second device 122 in the communications network 100.

The IMS node 130 may comprise an input and output interface 600 configured to communicate with network nodes such as the server node 140, the first device 121 and the second device 122. The input and output interface may comprise a wireless receiver (not shown) and a wireless transmitter (not shown).

The IMS node 130 is further configured to, e.g. by means of an obtaining unit 610 in the IMS node 130, obtain from the server node 140, the number of respective data delta. Each data delta is adapted to be related to the respective device out of the number of devices 120 at the respective subsequent point in time. The respective data delta is adapted to comprise only categorization data that is updated compared to categorization data related to a point in time that is earlier than the subsequent point in time.

The IMS node 130 may further be configured to, e.g. by means of the obtaining unit 610 in the IMS node 130, obtain the number of full datasets from the server node 140. Each full dataset is adapted to comprise the complete set of the categorization data adapted to be related to the respective device out of the number of devices 120 at the respective first point in time.

The IMS node 130 may further be configured to, e.g. by means of the obtaining unit 610 in the IMS node 130, obtain the number of full datasets from the server node 140, by downloading the number of full datasets from the server node 140 at the first point in time, and store each full data related to the respective device out of the number of devices 120 in a database.

The IMS node 130 may further be configured to, e.g. by means of the obtaining unit 610 in the IMS node 130, obtain from the server node 140 the number of respective data delta adapted to be related to the respective device out of the number of devices 120, by downloading the respective data delta from the server node 140 at configured time intervals and store the respective data delta adapted to be related to respective device out of the number of devices 120 in the database.

Each of the obtained data delta out of the number of data delta related to the subsequent point in time, may be adapted to be created based on the respective cursor.

The number of respective data delta from the server node 140 may be adapted to be obtained at subsequent time intervals.

The IMS node 130 is further configured to, e.g. by means of an enforcing unit 620 in the IMS node 130, upon receiving from the first device 121, a call invitation to the second device 122, enforce the policy related to categorizing the type of communication of the call, to establish the trust level adapted to be associated with the first device 121. The enforcing is adapted to be based on whether a data delta relating to the first device 121 is obtained among the number of obtained data delta adapted to be related to the number of devices 120.

The IMS node 130 is further configured to, e.g. by means of a sending unit 630 in the IMS node 130, for each respective device out of the number of devices 120, send to the server node 140, a request for said data delta. The request for data delta is adapted to comprise a cursor pointing out a data delta that was obtained from the server node 140, at said time that is earlier than the subsequent point in time.

The IMS node 130 may further be configured to, e.g. by means of a checking unit 640 in the IMS node 130, upon receiving the call invitation to the called device 122, check in the database whether the data delta adapted to be related to the first device 121 is obtained among the number of obtained data delta related to the number of devices 120.

The IMS node 130 may be configured to enforce the policy based on said checking of the database.

The embodiments herein may be implemented through a respective processor or one or more processors, such as the processor 650 of a processing circuitry in the IMS node 130 depicted in FIG. 6a, together with respective computer program code for performing the functions and actions of the embodiments herein. The program code mentioned above may also be provided as a computer program product, for instance in the form of a data carrier carrying computer program code for performing the embodiments herein when being loaded into the IMS node 130. One such carrier may be in the form of a CD ROM disc. It is however feasible with other data carriers such as a memory stick. The computer program code may furthermore be provided as pure program code on a server and downloaded to the IMS node 130.

The IMS node 130 may further comprise a memory 660 comprising one or more memory units. The memory 660 comprises instructions executable by the processor 650 in the IMS node 130. The memory 660 is arranged to be used to store e.g. information, messages, indications, requests, policies, categorization data, data delta, cursors, full datasets, invitations, communication data and applications to perform the methods herein when being executed in the IMS node 130.

In some embodiments, a computer program 670 comprises instructions, which when executed by the respective at least one processor 650, cause the at least one processor 650 of the IMS node 130 to perform the actions above.

In some embodiments, a respective carrier 680 comprises the respective computer program 670, wherein the carrier 680 is one of an electronic signal, an optical signal, an electromagnetic signal, a magnetic signal, an electric signal, a radio signal, a microwave signal, or a computer-readable storage medium.

Those skilled in the art will appreciate that the units in the IMS node 130 described above may refer to a combination of analog and digital circuits, and/or one or more processors configured with software and/or firmware, e.g. stored in the IMS node 130, that when executed by the respective one or more processors such as the processors described above.

One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7A:
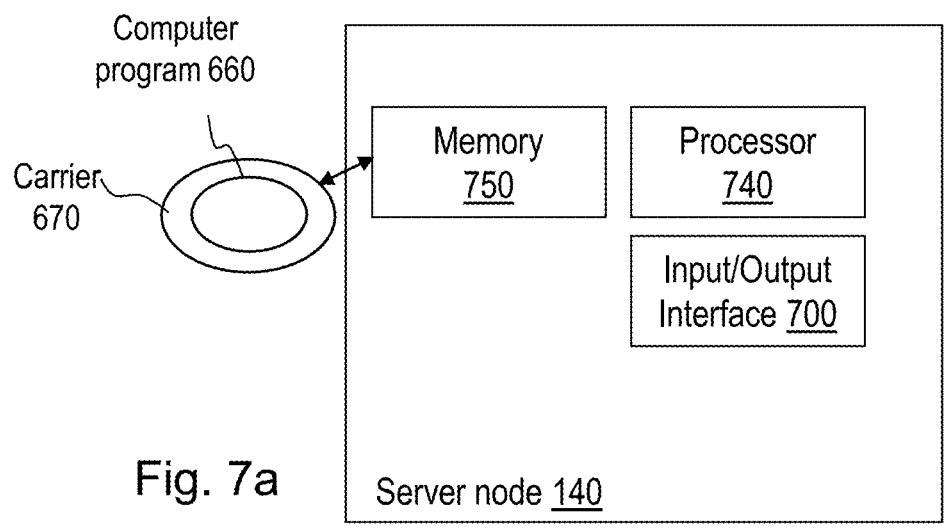
FIG. 7a-b are schematic block diagrams illustrating embodiments of a server node.
Figure 7B:
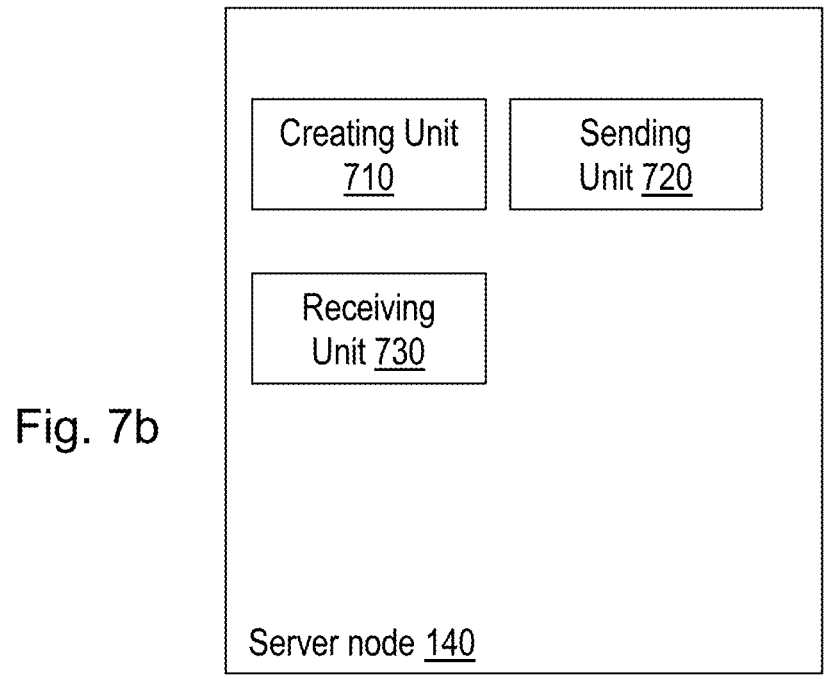

To perform the method actions above, the server node 140 may comprise an arrangement depicted in FIGS. 7a and b. The server node 140 is configured to handle categorization data associated to a first device 121 in an incoming call invitation from the first device 121 to a second device 122 in a communications network 100.

The server node 140 may comprise an input and output interface 700 configured to communicate with network nodes such as the IMS node 130. The input and output interface may comprise a wireless receiver (not shown) and a wireless transmitter (not shown).

The server node 140 is further configured to, e.g. means of a creating unit 710 in the server node 140, create a number of respective data delta, each data delta being adapted to be related to the respective device out of the number of devices 120 at the respective subsequent point in time. The respective data delta is adapted to comprise only categorization data that is updated compared to categorization data related to the point in time that is earlier than the subsequent point in time.

Each created data delta out of the number of created data delta related to the subsequent point in time, may be adapted to be created based on the respective cursor.

The server node 140 may further be configured to, e.g. means of the creating unit 710 in the server node 140, create each respective of data delta, by further update each respective full dataset adapted to be related to the device, with the associated created data delta.

The number of respective data delta may be adapted to be created and sent to the IMS node 130 at subsequent time intervals.

The server node 140 is further configured to, e.g. means of a sending unit 720 in the server node 140, send each of the respective created data delta out of the number of respective data delta, to the IMS node 130. This enables the IMS node 130 to, upon receiving from the first device 121, a call invitation to the second device 122, enforce the policy adapted to be related to categorizing a type of communication of the call to establish a trust level associated with the first device 121. The enforcing is adapted to be based on whether the data delta relating to the first device 121 is obtained among the number of obtained data delta adapted to be related to the number of devices 120.

The server node 140 may further be configured to, e.g. means of the sending unit 720 in the server node 140, send to the IMS node 130, the number of full datasets. Each full dataset is adapted to comprise the complete set of the categorization data adapted to be related to the respective device out of the number of devices 120 at the respective first point in time.

The server node 140 may further be configured to, e.g. means of a receiving unit 730 in the server node 140, for each respective device out of the number of devices 120, receive from the IMS node 130, the request for said data delta. The request for data delta is adapted to comprise the cursor adapted to point out the data delta that was sent to the IMS node 130 at said time that is earlier than the subsequent point in time.

The embodiments herein may be implemented through a respective processor or one or more processors, such as the processor 740 of a processing circuitry in the server node 140 depicted in FIG. 7a, together with respective computer program code for performing the functions and actions of the embodiments herein. The program code mentioned above may also be provided as a computer program product, for instance in the form of a data carrier carrying computer program code for performing the embodiments herein when being loaded into the server node 140. One such carrier may be in the form of a CD ROM disc. It is however feasible with other data carriers such as a memory stick. The computer program code may furthermore be provided as pure program code on a server and downloaded to the server node 140.

The server node 140 may further comprise a memory 750 comprising one or more memory units. The memory 750 comprises instructions executable by the processor 740 in the server node 140. The memory 750 is arranged to be used to store e.g. information, messages, indications, requests, policies, categorization data, data delta, cursors, full datasets, invitations, communication data and applications to perform the methods herein when being executed in the server node 140.

In some embodiments, a computer program 760 comprises instructions, which when executed by the respective at least one processor 740, cause the at least one processor 740 of the server node 140 to perform the actions above.

In some embodiments, a respective carrier 770 comprises the respective computer program 760, wherein the carrier 770 is one of an electronic signal, an optical signal, an electromagnetic signal, a magnetic signal, an electric signal, a radio signal, a microwave signal, or a computer-readable storage medium.

Those skilled in the art will appreciate that the units in the server node 140 described above may refer to a combination of analog and digital circuits, and/or one or more processors configured with software and/or firmware, e.g. stored in the server node 140, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 8:
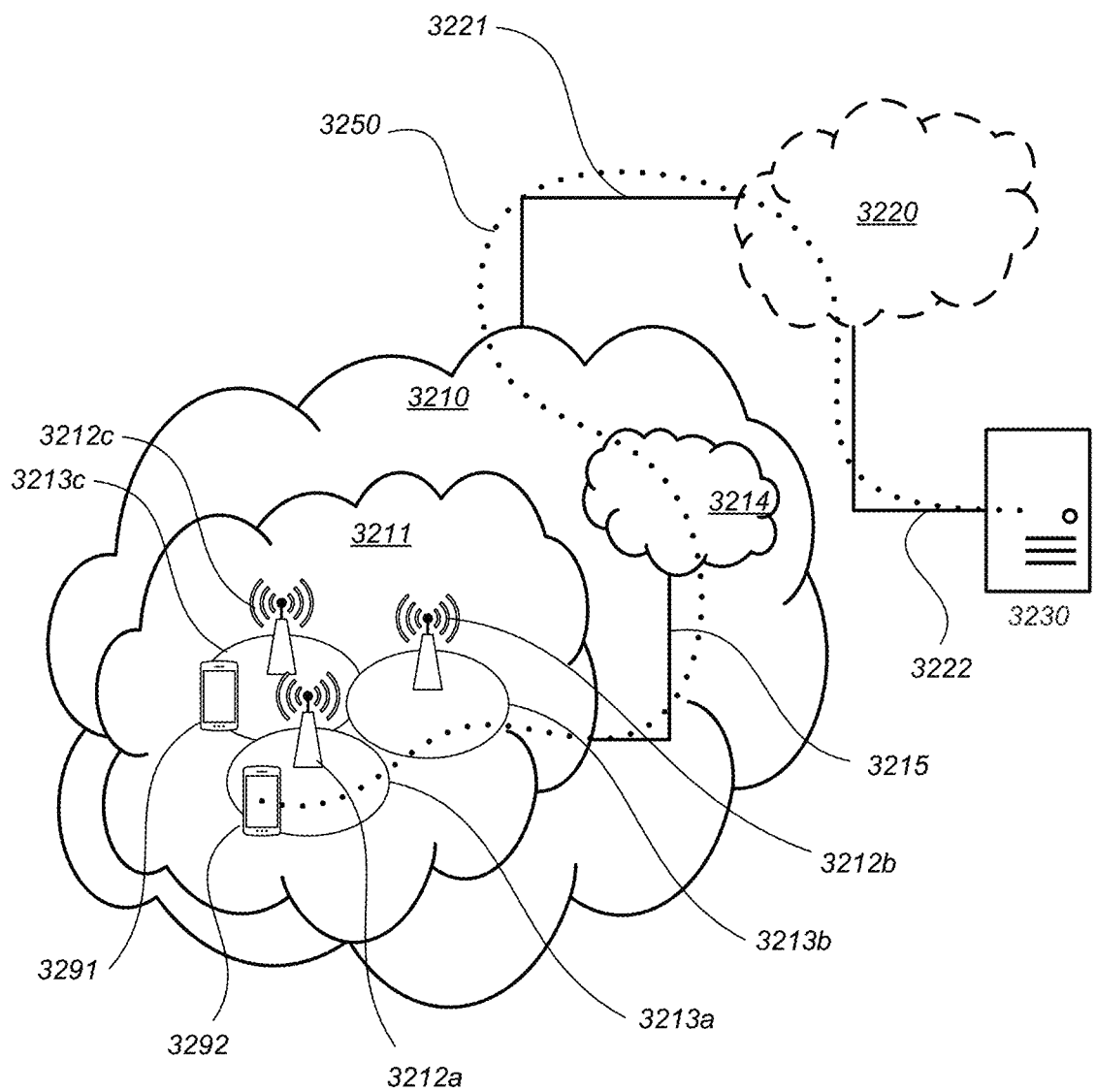
FIG. 8 schematically illustrates a telecommunication network connected via an intermediate network to a host computer.

With reference to FIG. 8, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as the first UE 121 and/or a Non-AP STA 3291 located in coverage area 3213c is configured to wirelessly connect to, or be paged by, the corresponding base station 3212c. A second UE 3292 such as the second UE 122 and/or a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to setup and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to setup and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

Figure 9:
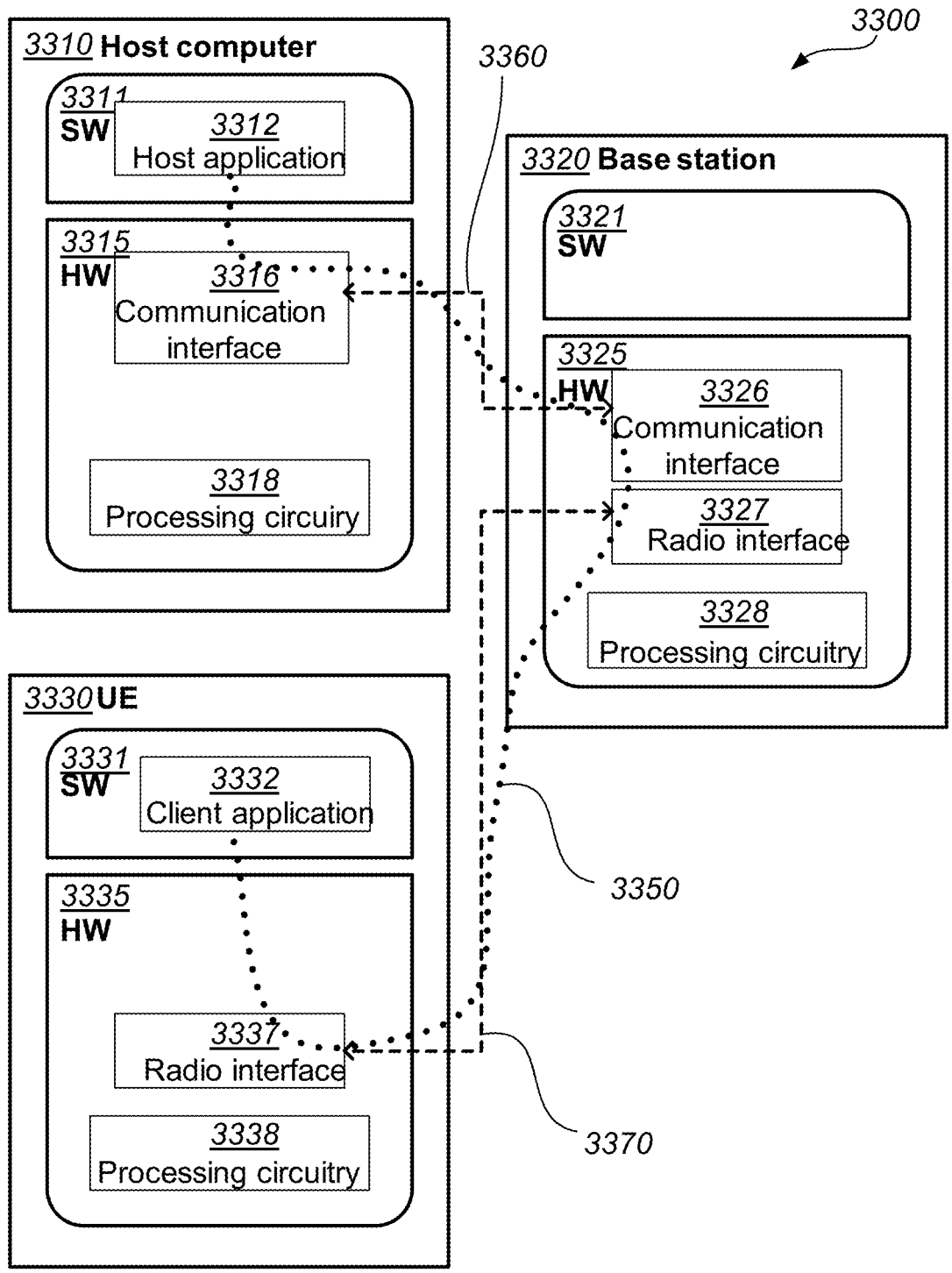
FIG. 9 is a generalized block diagram of a host computer communicating via a base station with a user equipment over a partially wireless connection.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 10, 11:
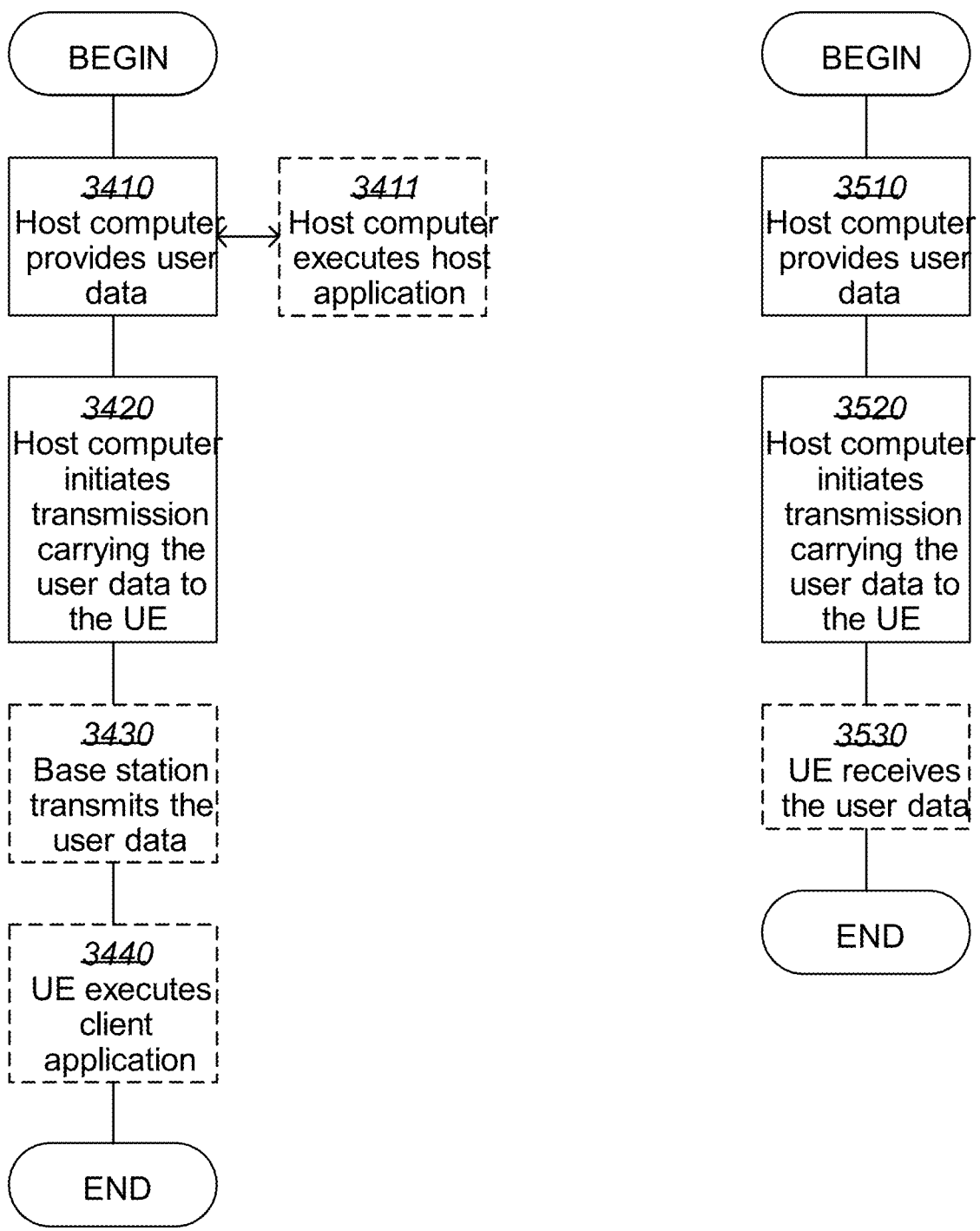
FIGS. 10-13 are flowcharts illustrating methods implemented in a communication system including a host computer, a base station and a user equipment.

FIG. 10 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 10 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 11 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 12, 13:
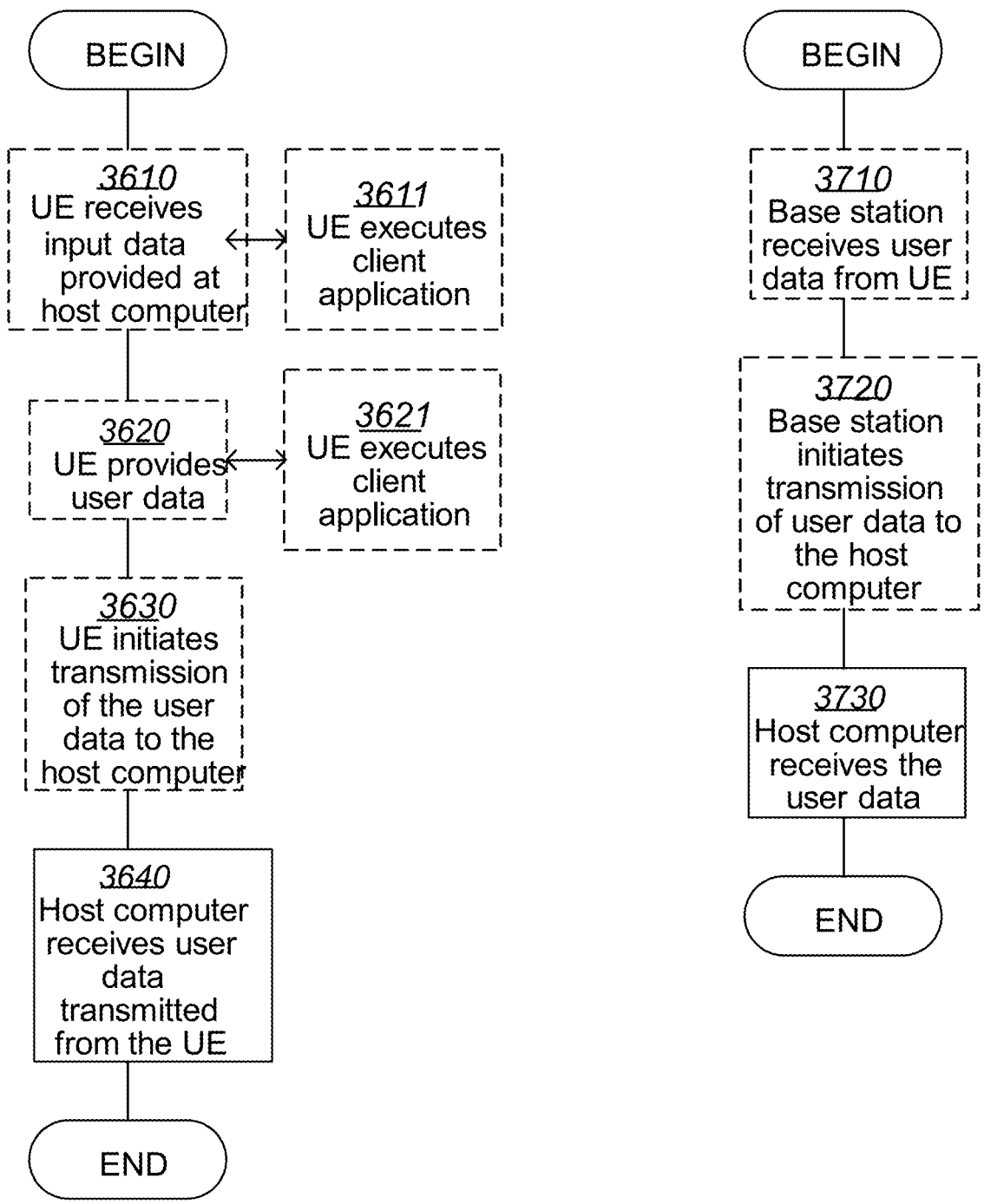

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 12 will be included in this section. In an optional first step 3610 of the method, the UE receives input data provided by the host computer. Additionally, or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 9. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the preferred embodiments described above. Various alternatives, modifications and equivalents may be used.

The invention claimed is:

1. A method performed by an Internet protocol Multimedia System, IMS, node, for handling categorization data associated to a first device in an incoming call invitation from the first device to a second device in a communications network, the method comprising:
obtaining from the server node, a number of respective data delta, each data delta relating to a respective device out of a number of devices at a respective subsequent point in time, which respective data delta comprises only categorization data that is updated compared to categorization data relating to a point in time that is earlier than the subsequent point in time,
upon receiving from the first device, a call invitation to the second device, enforcing a policy relating to categorizing the type of communication of the call, to establish a trust level associated with the first device, which enforcing is based on whether a data delta relating to the first device is obtained among the number of obtained data delta relating to the number of devices;
for each respective device out of the number of devices, sending to the server node, a request for said data delta, which request for data delta comprises a cursor pointing out a data delta that was obtained from the server node, at said time that is earlier than the subsequent point in time, wherein each of the obtained data delta out of the number of data delta relating to the subsequent point in time, is created based on the respective cursor; and
upon receiving the call invitation to the called device, checking in the database whether a data delta relating to the first device is obtained among the number of obtained data delta relating to the number of devices, and
wherein the enforcing of the policy is based on said checking of the database.

2. The method according to claim 1, further comprising:
obtaining a number of full datasets from the server node, where each full dataset comprises a complete set of the categorization data relating to a respective device out of the number of devices at a respective first point in time.

3. The method according to claim 2, wherein the obtaining of the number of full datasets from the server node, is performed by:
downloading the number of full datasets from the server node at the first point in time, and storing each full data related to the respective device out of the number of devices in a database.

4. The method according to claim 1, wherein the obtaining from the server node of the number of respective data delta relating to the respective device out of the number of devices, is performed by:
downloading the respective data delta from the server node at configured time intervals and storing the respective data delta related to respective device out of the number of devices in the database.

5. The method according to claim 1, wherein the number of respective data delta from the server node is obtained at subsequent time intervals.

6. A computer program comprising instructions stored on a memory coupled to a processor, which when executed by the processor, causes the processor to perform actions according to claim 1.

7. A non-transitory computer readable medium comprising the computer program of claim 6.

8. A method performed by a server node handling categorization data associated to a first device in an incoming call invitation from the first device to a second device in a communications network, the method comprising:
creating a number of respective data delta, each data delta relating to a respective device out of a number of devices at a respective subsequent point in time, which respective data delta comprises only categorization data that is updated compared to categorization data relating to a point in time that is earlier than the subsequent point in time,
sending each of the respective created data delta out of the number of respective data delta, to an Internet protocol Multimedia System, IMS, node, enabling the IMS node to, upon receiving from the first device, a call invitation to the second device, enforce a policy relating to categorizing a type of communication of the call to establish a trust level associated with the first device, which enforcing is to be based on whether a data delta relating to the first device is obtained among the number of obtained data delta relating to the number of devices; and for each respective device out of the number of devices, receiving from the IMS node, a request for said data delta, which request for data delta comprises a cursor pointing out a data delta that was sent to the IMS node at said time that is earlier than the subsequent point in time;

wherein each created data delta out of the number of created data delta relating to the subsequent point in time, is created based on the respective cursor;

wherein the number of respective created data delta is sent to the IMS node at subsequent time intervals.

9. The method according to claim 8, further comprising:
sending to the IMS node, a number of full datasets, where each full dataset comprises a complete set of the categorization data relating to a respective device out of the number of devices at a respective first point in time.

10. The method according to claim 8, wherein each respective creating of data delta, further comprises:
updating each respective full dataset relating to the device, with the associated created data delta.

11. A computer program comprising instructions stored on a memory coupled to a processor, which when executed by the processor, causes the processor to perform actions according to claim 8.

12. A non-transitory computer readable medium comprising the computer program of claim 11.

13. An Internet protocol Multimedia System, IMS, node, configured to handle categorization data associated to a first device in an incoming call invitation from the first device to a second device in a communications network, the IMS node further being configured to:
obtain from the server node, a number of respective data delta, each data delta is adapted to be related to a respective device out of a number of devices at a respective subsequent point in time, which respective data delta is adapted to comprise only categorization data that is updated compared to categorization data related to a point in time that is earlier than the subsequent point in time, upon receiving from the first device, a call invitation to the second device, enforce a policy related to categorizing the type of communication of the call, to establish a trust level adapted to be associated with the first device, which enforcing is adapted to be based on whether a data delta relating to the first device is obtained among the number of obtained data delta adapted to be related to the number of devices;

for each respective device out of the number of devices, send to the server node, a request for said data delta, which request for data delta is adapted to comprise a cursor pointing out a data delta that was obtained from the server node, at said time that is earlier than the subsequent point in time, wherein each of the obtained data delta out of the number of data delta related to the subsequent point in time, is adapted to be created based on the respective cursor; and upon receiving the call invitation to the called device, check in the database whether a data delta relating to the first device is obtained among the number of obtained data delta relating to the number of devices, wherein the enforcing of the policy is based on said checking of the database.

14. The IMS node according to claim 13, further being configured to:
obtain a number of full datasets from the server node, where each full dataset is adapted to comprise a complete set of the categorization data adapted to be related to a respective device out of the number of devices at a respective first point in time.

15. The IMS node according to claim 14, further being configured to obtain the number of full datasets from the server node, by:
download the number of full datasets from the server node at the first point in time, and store each full data related to the respective device out of the number of devices in a database.

* * * * *